(12) United States Patent
Kim et al.

(10) Patent No.: US 11,218,532 B2
(45) Date of Patent: Jan. 4, 2022

(54) APPARATUS AND METHOD FOR PROVIDING AUDIO STREAMING SERVICE

(71) Applicant: LG Electronics Inc., Seoul (KR)

(72) Inventors: Jinwoo Kim, Seoul (KR); Joonseok Maeng, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/869,969

(22) Filed: May 8, 2020

(65) Prior Publication Data

US 2021/0297474 A1 Sep. 23, 2021

(51) Int. Cl.
- H04L 29/08 (2006.01)
- H04L 29/06 (2006.01)
- H04L 12/851 (2013.01)
- H04L 12/853 (2013.01)

(52) U.S. Cl.
CPC ........ H04L 65/80 (2013.01); H04L 29/06027 (2013.01); H04L 47/2416 (2013.01); H04L 47/2433 (2013.01); H04L 65/607 (2013.01)

(58) Field of Classification Search
CPC .............................. H04L 65/80; H04L 65/607
See application file for complete search history.

(56) References Cited

U.S. PATENT DOCUMENTS

| | | | |
|---|---|---|---|
| 6,418,169 | B1 | 7/2002 | Datari |
| 2004/0027991 | A1 | 2/2004 | Jang et al. |
| 2005/0102385 | A1* | 5/2005 | Muhonen ............... H04H 40/27 709/223 |
| 2007/0081536 | A1 | 4/2007 | Kim et al. |
| 2008/0046978 | A1* | 2/2008 | Rieger .................... H04L 63/10 726/4 |

FOREIGN PATENT DOCUMENTS

| | | |
|---|---|---|
| JP | 2001078181 | 3/2001 |
| KR | 20040009928 | 1/2004 |
| KR | 20070040718 | 4/2007 |
| KR | 20070060980 | 6/2007 |

OTHER PUBLICATIONS

PCT International Search Report in International Appln. No. PCT/KR2020/003911, dated Dec. 17, 2020, 22 pages (with English translation).

* cited by examiner

*Primary Examiner* — Adnan M Mirza

(74) *Attorney, Agent, or Firm* — Fish & Richardson P.C.

(57) ABSTRACT

A content providing apparatus for providing an audio streaming service includes a communication modem configured to communicate with a content receiving apparatus through a wired/wireless network, and a processor configured to determine target audio content, determine an audio packet generating rule, transmit the audio packet generating rule to the content receiving apparatus through the communication modem, generate an audio packet from audio data corresponding to the target audio content based on the audio packet generating rule, and transmit the audio packet to the content receiving apparatus through the communication modem.

7 Claims, 8 Drawing Sheets

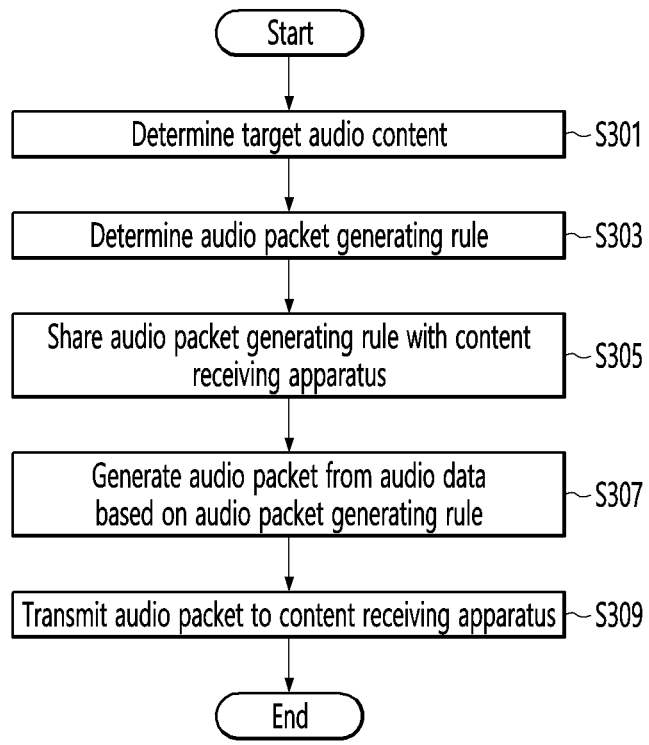
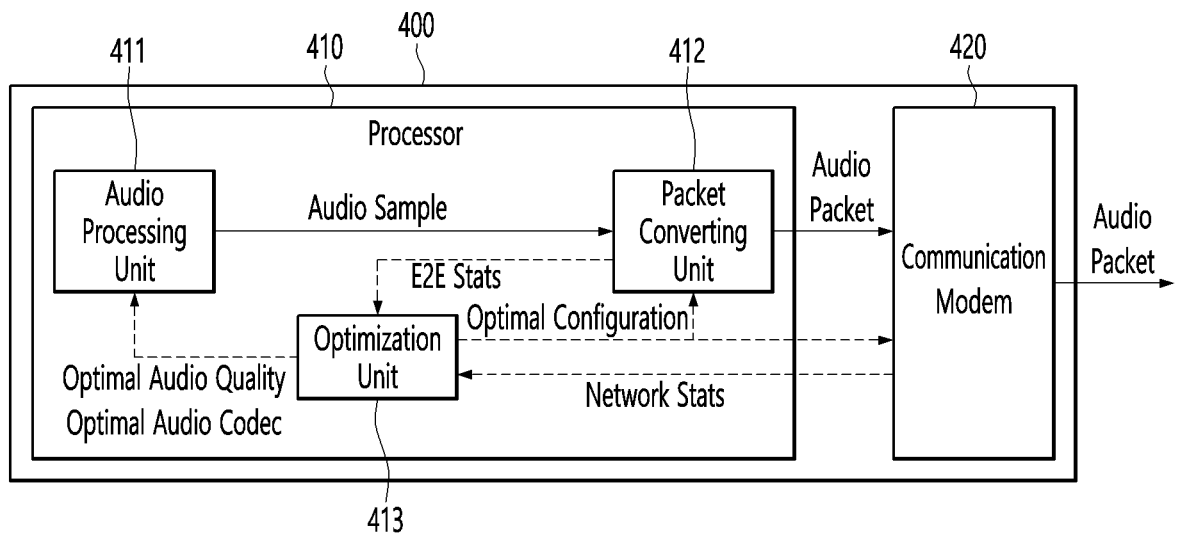

APPARATUS AND METHOD FOR PROVIDING AUDIO STREAMING SERVICE

CROSS-REFERENCE TO RELATED APPLICATIONS

This application claims priority to Patent Cooperation Treaty No. PCT/KR2020/003911 filed on Mar. 20, 2020, the entire contents of which are hereby incorporated by reference in its entirety.

BACKGROUND

The present disclosure relates to an apparatus and a method for providing an audio streaming service.

Recently, multimedia streaming services using networks, such as Internet streaming services or Over The Top (OTT) services, have been increasing. In such multimedia streaming services, a media receiver may receive multimedia content data through a network and output multimedia content in real time or at regular intervals by using the received multimedia content data. Such multimedia streaming services may also provide a function capable of controlling the quality of multimedia content to be transmitted.

As the quality of the multimedia content is higher, the size of the multimedia content data to be transmitted is increased. Therefore, if the quality of the multimedia content can be flexibly adjusted considering the network state, seamless media content can be provided even though the quality of the multimedia content is reduced. However, an existing dynamic content quality management technology determines content quality by collecting network state information and predicting network performance. Therefore, it may be difficult to quickly cope with a rapid change in network state.

SUMMARY

The present disclosure provides an apparatus and a method for providing an audio streaming service with a quality suitable for a network state even if network state information is not collected.

One embodiment of the present disclosure provides a content providing apparatus, which shares an audio packet generating rule with a content receiving apparatus, generates an audio packet from audio data corresponding to the target audio content based on the audio packet generating rule, and transmits the generated audio packet to the content receiving apparatus, and a method therefor.

Also, one embodiment of the present disclosure provides a content providing apparatus, which divides audio data into a plurality of unit data based on audio data division unit, groups the plurality of unit data into a plurality of groups, determines transmission priorities for the plurality of unit data by determining transmission priorities for a plurality of groups, converts the plurality of unit data into a plurality of audio packets, and transmits the plurality of audio packets to the content receiving apparatus based on the transmission priorities, and a method therefor.

Also, one embodiment of the present disclosure provides a content providing apparatus, which transmits an audio packet whose effective transmission time has not passed to a content receiving apparatus, and a method therefor.

One embodiment of the present disclosure provides a content receiving apparatus, which receives an audio packet generating rule from a content providing apparatus, receives an audio packet corresponding to target audio content from a content providing apparatus, and generates audio data corresponding to audio content from the audio packet based on the audio packet generating rule, and a method therefor.

Also, one embodiment of the present disclosure provides a content receiving apparatus, which receives a plurality of audio packets, which are converted from unit data, from a content providing apparatus, converts the plurality of audio packets into a plurality of unit data, and generates audio data by recombining the order of the plurality of unit data based on the transmission priorities, and a method therefor.

Also, one embodiment of the present disclosure provides a content receiving apparatus, which stores the plurality of unit data corresponding to a plurality of received audio packets in a reception buffer, moves, to a playback buffer, unit data corresponding to a playback target period among unit data stored in the reception buffer, and generates audio data from the unit data included in the playback buffer, and a method therefor.

The details of one or more embodiments are set forth in the accompanying drawings and the description below. Other features will be apparent from the description and drawings, and from the claims.

BRIEF DESCRIPTION OF THE DRAWINGS

FIG. 3 is a flowchart illustrating an operating method of a content providing apparatus for providing an audio streaming service, according to an embodiment of the present disclosure.

FIG. 4 is a diagram illustrating an operating method of a conventional content providing apparatus.

DETAILED DESCRIPTION OF THE EMBODIMENTS

Figure 1:
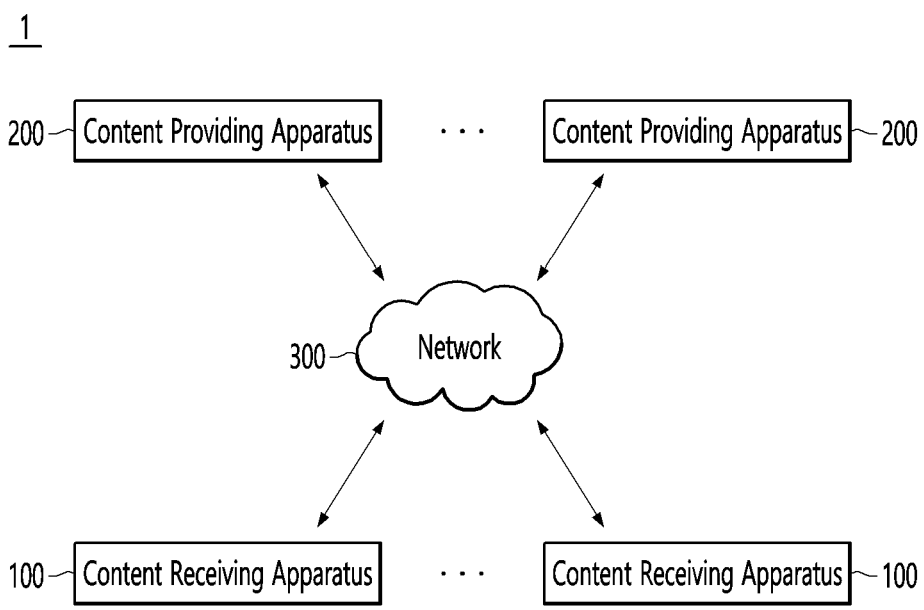
FIG. 1 is a diagram illustrating a system for providing an audio streaming service, according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter through an intervening part (or element, device, etc.). It will be further understood that when one component is referred to as being 'directly connected' or 'directly linked' to another component, it means that no intervening component is present.

FIG. 1 is a diagram illustrating a system 1 for providing an audio streaming service, according to an embodiment of the present disclosure.

Referring to FIG. 1, the system 1 for providing the audio streaming service may include at least one content receiving apparatus 100 and at least one content providing apparatus 200. The content receiving apparatus 100 and the content providing apparatus 200 may communicate with each other through a network 300, and the network 300 may include a wireless network as well as a wired network.

The content providing apparatus 200 is one of the apparatuses for providing the audio streaming service and may refer to an apparatus for providing audio content provided by the audio streaming service. The content providing apparatus 200 may generate an audio packet for audio content (target audio content) to be provided and may transmit the generated audio packet to the content receiving apparatus 100.

The content providing apparatus 200 may be a server and may provide audio content to one or more content receiving apparatuses 100 through the network 300. In this aspect, the content providing apparatus 200 may be referred to as a content providing server.

In one embodiment, the plurality of content providing apparatuses 200 may be constituted by a cloud server or a cluster server.

The content receiving apparatus 100 is one of the apparatuses for providing the audio streaming service and may refer to an apparatus for receiving audio content provided by the audio streaming service. The content receiving apparatus 100 may receive an audio packet from the content providing apparatus 200 and convert the received audio packet into audio data of a Pulse-Code Modulation (PCM) format.

The content receiving apparatus 100 includes an audio output interface or a speaker capable of outputting audio data or audio signals in the form of sound waves, and may outputs an audio signal corresponding to audio content through the audio output interface or the speaker in the form of sound waves.

In one embodiment, when the content receiving apparatus 100 is connected to another audio output device (not illustrated), the content receiving apparatus 100 may transmit the converted audio signal to an audio output device (not illustrated) so as to output the audio signal corresponding to audio content through the audio output device (not illustrated) in the form of sound waves. For example, when the content receiving apparatus 100 is a set-top box, the content receiving apparatus 100 may output the audio signal corresponding to the audio content through a separately connected TV or speaker in the form of sound waves.

Figure 2:
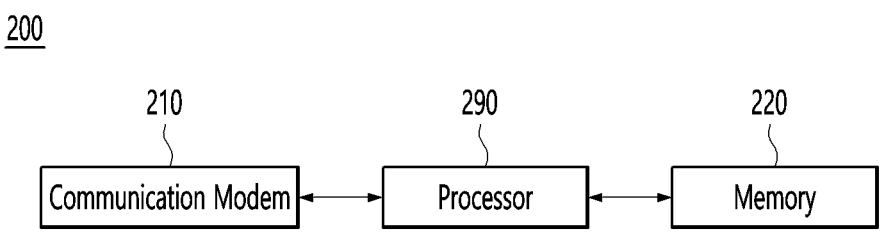
FIG. 2 is a block diagram illustrating a content providing apparatus for providing an audio streaming service, according to an embodiment of the present disclosure.

FIG. 2 is a block diagram illustrating the content providing apparatus 200 for providing the audio streaming service, according to an embodiment of the present disclosure.

Hereinafter, the content providing apparatus 200 may be referred to as a content providing server.

Referring to FIG. 2, the content providing apparatus 200 for providing the audio streaming service may include a communication modem 210, a memory 220, a processor 290, and the like.

The communication modem 210 may also be referred to as a communication circuit.

The communication modem 210 may transmit and receive data to and from the content receiving apparatus 100 or another content providing apparatus 200 through the network 300 by using wired/wireless communication technology. The communication technology used by the communication modem 210 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The communication modem 210 may transmit the audio packet generated by the processor 290 to the content receiving apparatus 100 through the network 300.

The communication modem 210 may receive audio content data from another content providing apparatus 200 or a content storage apparatus (not illustrated).

The memory 220 may store data supporting various functions of the content providing apparatus 200. Also, the memory 220 may store various application programs to be driven by the content providing apparatus 200 and data and instructions for the operation of the content providing apparatus 200.

The memory 220 may store audio content or audio data to be provided by the audio streaming service.

The memory 220 may store an audio packet generating rule preset used for generating the audio packet.

The processor 290 may drive an application program stored in memory 220. Furthermore, the processor 290 may operate two or more of the components included in the content providing apparatus 200 in combination so as to drive the application program.

The processor 290 may control the overall operation of the content providing apparatus 200 in addition to the operations related to the application program. The processor 290 may provide or process appropriate information or functions to the user by processing signals, data, information, or the like input or output through the above-described components or by driving the application program stored in the memory 220.

When it is necessary to link an external device so as to perform the determined operation, the processor 290 may generate a control signal for controlling the external device and transmit the generated control signal to the external device.

The processor 290 may determine audio content to be provided to the content receiving apparatus 100, convert audio content data corresponding to the determined audio content into audio packets, and transmit the converted audio packets to the content receiving apparatus 100 through the communication modem 210. The processor 290 may be referred to as an audio processor in that the processor 290 generates the audio packets.

The processor 290 may determine audio content to be provided to the content receiving apparatus 100 based on a request from the content receiving apparatus 100 or a predefined schedule.

When the audio data corresponding to the determined audio content is not stored in the memory 220, the processor 290 may receive audio data corresponding to the determined audio content from another content providing apparatus 200 or the content storage apparatus (not illustrated) through the communication modem 210.

Meanwhile, various embodiments may be implemented within a recording medium readable by a computer or a similar device by using software, hardware, or combination thereof.

FIG. 3 is a flowchart illustrating an operating method of the content providing apparatus 200 for providing the audio streaming service, according to an embodiment of the present disclosure.

Referring to FIG. 3, the processor 290 of the content providing apparatus 200 determines target audio content (S301).

The target audio content refers to audio content to be streamed in the audio streaming service and may be determined by a preset value or a user's setting value.

The content providing apparatus 200 may receive a user's setting value for the target audio content from the content receiving apparatus 100 or a separate user terminal (not illustrated).

The user's setting value may include a setting value indicating the target audio content itself and a setting value indicating an audio streaming channel. For example, the user may input a setting value for determining a specific song of a specific singer as the target audio content or a setting value for determining a radio channel or a specific broadcast channel as the audio streaming channel. The audio streaming channel is determined by the streamer of an audio content channel, such as radio or Internet broadcasting. However, since the audio content to be streamed is determined as the channel is determined, the setting of the audio streaming channel may be regarded as the setting of the target audio content.

The processor 290 of the content providing apparatus 200 determines an audio packet generating rule (S303).

The data (or audio data) of the target audio content is converted into an audio packet and transmitted from the content providing apparatus 200 to the content receiving apparatus 100, and the audio packet generating rule may refer to a rule used to convert the audio data into the audio packet.

When the content providing apparatus 200 stores a plurality of audio packet generating rule presets in the memory 220, the processor 290 may select an audio packet generating rule preset to be used for generating an audio packet among the plurality of stored audio packet generating rule presets. For example, the content providing apparatus 200 may determine a second audio packet generating rule preset among five stored audio packet generating rule presets as the audio packet generating rule to be used for generating the audio packet.

The processor 290 may determine an audio packet generating rule, considering the quality of audio data or target audio quality.

The audio packet generating rule may include a division unit of audio data. The division unit of audio data may include a single sample, a plurality of samples, a group of bits in a sample, and the like. When the division unit of audio data is a plurality of samples, the audio data may be divided into units composed of a plurality of samples. When the division unit of audio data is a group of bits in a sample, the audio data may be divided into units composed of a group of bits included in one sample. The data divided according to the division unit may be referred to as unit data. Hereinafter, it is assumed that the division unit is a single sample, and the term "sample" is used instead of the term "unit data".

Furthermore, the audio packet generating rule may include the number of sample groups, the number of transmission priorities of audio packets, a transmission priority allocating rule, or a transmission time range.

Hereinafter, the term "sample group" may be used interchangeably with the term "group" or the term "audio sample group".

In addition, period magnitude information may be included in the audio packet generating rule.

The transmission priority may refer to importance of each group or sample, and a sample having a high transmission priority is preferentially transmitted from the content providing apparatus 200 to the content receiving apparatus 100. The playback order may be auxiliarly used as a priority determination criterion among samples having the same transmission priority.

The transmission priority allocating rule may include the number of transmission priorities.

Hereinafter, the term "transmission priority" may be used interchangeably with the term "priority".

The transmission time range may refer to the expression of a unit or size of an audio packet to be transmitted in time, and the audio packet outside the transmission time range may not be retransmitted even if transmission fails. For example, when the transmission time range is 1 second, the content providing apparatus 200 transmits an audio packet in units of 1 second to the content receiving apparatus 100. Even if some of the audio packets in 1 second units fail to be transmitted, part of the audio packet that failed to be transmitted may not be retransmitted when transmitting the next 1 second audio packet. That is, the transmission time range may refer to the effective transmission time of the audio packet.

Hereinafter, the term "transmission time range" and the term "effective transmission time" may be used interchangeably.

The processor 290 of the content providing apparatus 200 shares the audio packet generating rule with the content receiving apparatus 100 through the communication modem 210 (S305).

Since the content receiving apparatus 100 converts the audio packet received from the content providing apparatus 200 into audio data, the content receiving apparatus 100 also needs the same audio packet generating rule as that used for generating the audio packet in the content providing apparatus 200.

When the content providing apparatus 200 and the content receiving apparatus 100 store a plurality of audio packet generating rule presets, and the determined audio packet generating rule is included in the stored audio packet generating rule preset, the processor 290 of the content providing apparatus 200 may transmit only selection information or identification information among audio the packet generating rule presets to the content receiving apparatus 100 through the communication modem 210. For example, when the content providing apparatus 200 and the content receiving apparatus 100 store five audio packet generating rule presets and the determined audio packet generating rule preset is a second audio packet generating rule preset, the content providing apparatus 200 may transmit, to the content receiving apparatus 100, information indicating that the second audio packet generating rule preset is to be used.

If the same audio packet generating rule is already shared between the content providing apparatus 200 and the content receiving apparatus 100, this step S305 may be omitted.

Steps S303 and S305 of determining and sharing the audio packet generating rules may be performed in parallel with step S301 of determining the target audio content and may be performed in preference to step S301 of determining the target audio content.

The processor 290 of the content providing apparatus 200 generates an audio packet from audio data corresponding to the target audio content based on the audio packet generating rule (S307).

The generating of the audio packet from the audio data may mean converting audio data into an audio packet.

The audio packet may be generated based on the audio packet generating rule.

The processor 290 may group samples included in the audio data into a predetermined number of groups, may allocate priority to each group according to the priority allocating rule, may determine priority of each sample based on the priority allocated to each group, and may generate audio packet on a sample basis.

Hereinafter, the term "audio sample" and the term "sample" may be used interchangeably.

The processor 290 of the content providing apparatus 200 transmits the generated audio packet to the content receiving apparatus 100 through the communication modem 210 (S309).

The processor 290 may transmit the audio packet, to which the priority is allocated, to the content receiving apparatus 100 in the descending order of priority. The audio packet to which the priority is allocated may refer to an audio packet corresponding to the sample to which the priority is allocated.

The generated audio packet may be transmitted from the content providing apparatus 200 to the content receiving apparatus 100 through the wired/wireless network 300, and the content receiving apparatus 100 may convert the transmitted audio packets into audio data by using the same audio packet generating rule.

The entire audio packet generated by the content providing apparatus 200 may be entirely transmitted to the content receiving apparatus 100, or only part of the audio packet may be transmitted to the content receiving apparatus 100, according to the state of the network 300.

The order of steps illustrated in FIG. 3 is only an example, and the present disclosure is not limited thereto. That is, in one embodiment, the order of some steps illustrated in FIG. 3 may be changed. Also, in one embodiment, some operations illustrated in FIG. 3 may be performed in parallel. Furthermore, only some steps illustrated in FIG. 3 may be performed.

FIG. 4 is a diagram illustrating an operating method of a conventional content providing apparatus 400.

Referring to FIG. 4, the conventional content providing apparatus 400 may include a processor 410 and a communication modem 420. The processor 410 may include an audio processing unit (or an audio processor) 411, a packet converting unit 412, and an optimization unit 413.

The audio processing unit 411 may provide, to the content receiving apparatus, audio data corresponding to target audio content to be transmitted.

The packet converting unit 412 may generate an audio packet corresponding to the audio data.

The communication modem 420 may transmit the generated audio packet to the content receiving apparatus.

The optimization unit 413 may collect end-to-end state information (E2E stats) from the packet converting unit 412 and may collect network state information (network stats) from the communication modem 420. The optimization unit 413 may determine optimum parameters, such as optimal audio quality and optimal audio codec, based on the collected information, and may reflect the determined optimal parameters to the audio processing unit 411, the packet converting unit 412, and the communication modem 420.

As illustrated in FIG. 4, the conventional content providing apparatus 400 predicts the state of the network based on the network state information collected from the network and determines optimal audio streaming settings based on the predicted state of the network. Therefore, it is necessary to collect network state information and there is a limitation that it cannot accurately respond when the state of the network changes rapidly.

In addition, since the conventional content providing apparatus 400 attempts to transmit the converted audio packet without considering the effective transmission time, the transmission of the converted audio packet is delayed when the network state is rapidly deteriorated. Therefore, the playback of audio content is interrupted or a delay occurs.

Figure 5:
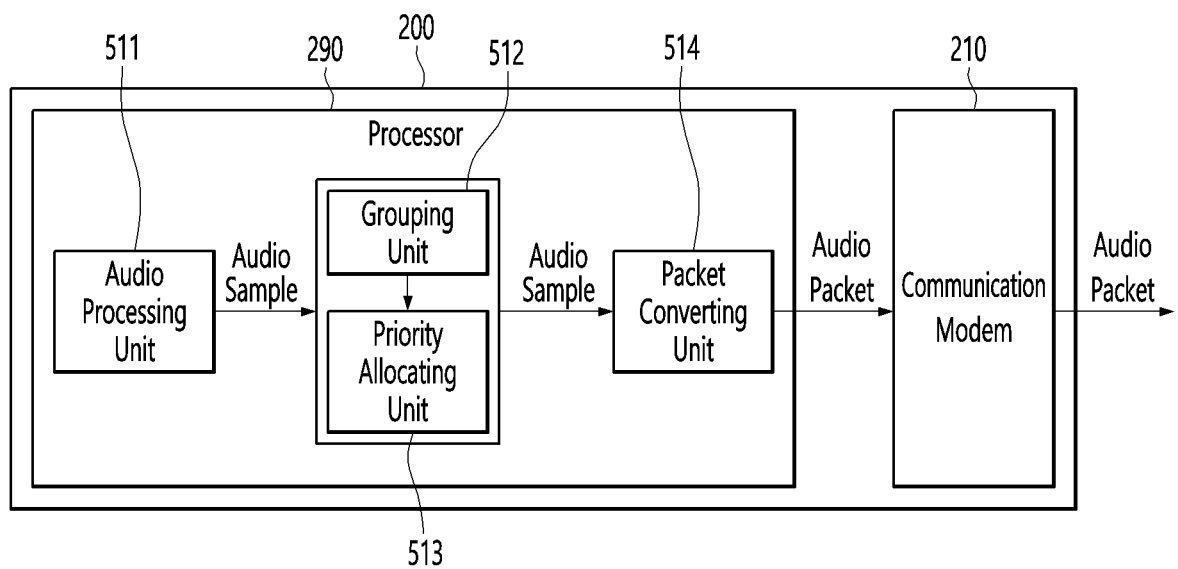
FIG. 5 is a diagram illustrating an operating method of a content providing apparatus, according to an embodiment of the present disclosure.

FIG. 5 is a diagram illustrating an operating method of the content providing apparatus 200, according to an embodiment of the present disclosure.

Referring to FIG. 5, the content providing apparatus 200 according to the embodiment of the present disclosure may include a processor 290 and a communication modem 210. The processor 290 may include an audio processing unit (or an audio processor) 511, a grouping unit 512, a priority allocating unit 513, and a packet converting unit 514.

All or part of the audio processing unit 511, the grouping unit 512, the priority allocating unit 513, and the packet converting unit 514 may refer to a hardware implementation included in the processor 290 or may refer to a software implementation using the processor 290.

The audio processing unit 511 may provide, to the content receiving apparatus, audio data corresponding to target audio content to be transmitted.

The grouping unit 512 may group audio samples included in audio data into a predetermined number of groups based on an audio packet generating rule. The process of distributing each audio sample into one of a plurality of groups may be referred to as grouping.

The priority allocating unit 513 may allocate priority to each audio sample group based on a priority allocating rule and may allocate priority to each sample based on the priority of each group. In one embodiment, even if the priority has already been allocated to the sample, the priority allocating unit 513 may deallocate the allocated priority from the sample when the effective transmission time of the sample has elapsed.

The packet converting unit 515 may generate audio packets on a sample basis or a sample set basis. In one embodiment, the packet converting unit 515 may generate the audio packet except for the sample whose effective transmission time has elapsed even if the priority is allocated to the sample.

The communication modem 210 may transmit the generated audio packets to the content receiving apparatus in the descending order of priority.

Compared with FIG. 4, the content providing apparatus 200 according to the embodiment of the present disclosure does not use end-to-end state information or network state information in the process of generating the audio packets. Therefore, there is an advantage that the audio packets can be generated without being affected by the network state or terminal state.

Also, even if the network state is rapidly deteriorated and all the generated audio packets cannot be transmitted, the content providing apparatus 200 according to the embodiment of the present disclosure transmits only the audio packets within the effective transmission time to the content receiving apparatus 100. Therefore, there is no problem that the playback of audio content is interrupted or delayed.

Figure 6:
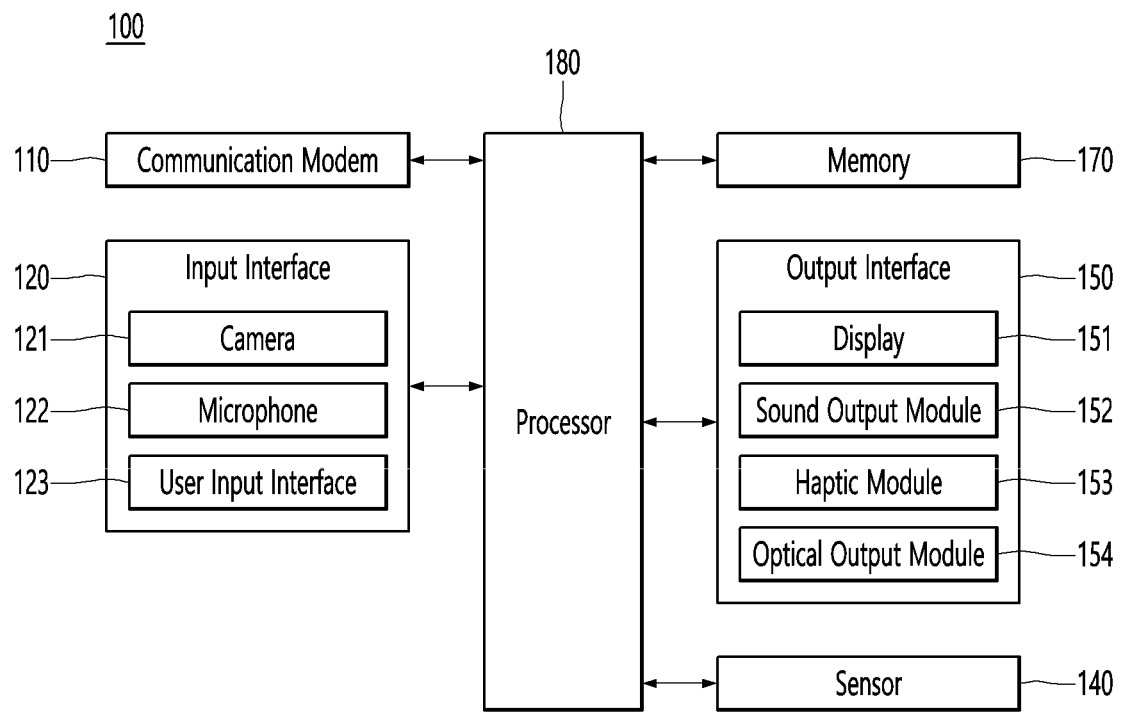
FIG. 6 is a diagram illustrating a content receiving apparatus for providing an audio streaming service, according to an embodiment of the present disclosure.

FIG. 6 is a diagram illustrating the content receiving apparatus 100 for providing the audio streaming service, according to an embodiment of the present disclosure.

Hereinafter, the content receiving apparatus 100 may be referred to as a terminal, a playback device, and the like.

The content receiving apparatus 100 may be implemented by a stationary device or a mobile device, such as a TV, a projector, a mobile phone, a smartphone, a desktop computer, a laptop, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a digital signage, a robot, a vehicle, and the like.

Referring to FIG. 6, the content receiving apparatus 100 may include a communication modem 110, an input interface 120, a learning processor 130, a sensor 140, an output interface 150, a memory 170, a processor 180, and the like.

The communication modem 110 may also be referred to as a communication circuit.

The communication modem 110 may transmit and receive data to and from the content providing apparatus 200 through the network 300 using wired/wireless communication technology. The communication technology used by the communication modem 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The communication modem 110 may receive an audio packet from the content providing apparatus 200 through the network 300.

The input interface 120 may acquire various kinds of data. Voice data or image data collected by the input interface 120 are analyzed and processed as a user's control command.

The input interface 120 may include a camera 121 for image signal input, a microphone 122 for receiving audio signal input, and a user input interface 123 for receiving information from a user.

The input interface 120 is used for inputting image information (or signal), audio information (or signal), data, or information inputted from a user and the content receiving apparatus 100 may include at least one camera 121 in order for inputting image information.

The camera 121 processes image frames such as a still image or a video obtained by an image sensor in a video call mode or a capturing mode. The processed image frame may be displayed on the display 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the content receiving apparatus 100 to correspond to the inputted information.

The user input interface 123 may include a mechanical input means (or a mechanical key, for example, a button, a dome switch, a jog wheel, and a jog switch at the front, back or side of the content receiving apparatus 100) and a touch type input means. As one example, a touch type input means may include a virtual key, a soft key, or a visual key, which is displayed on a touch screen through software processing or may include a touch key disposed at a portion other than the touch screen.

The sensor 140 may also be referred to as a sensor unit.

The sensor 140 may acquire at least one of internal information about the content receiving apparatus 100, ambient environment information about the content receiving apparatus 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

The output interface 150 may include at least one of a display 151, a sound output module 152, a haptic module 153, or an optical output module 154.

The display 151 may display (output) information processed in the content receiving apparatus 100. For example, the display 151 may display execution screen information of an application program running on the content receiving apparatus 100 or user interface (UI) and graphic user interface (GUI) information according to such execution screen information.

The display 151 may be formed with a mutual layer structure with a touch sensor or formed integrally, so that a touch screen may be implemented. Such a touch screen may serve as the user input interface 123 providing an input interface between the content receiving apparatus 100 and a user, and an output interface between the content receiving apparatus 100 and a user at the same time.

The sound output module 152 may output audio data received from the wireless communication modem 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the content receiving apparatus 100. An example of an event occurring in the content receiving apparatus 100 includes message reception, call signal reception, missed calls, alarm, schedule notification, e-mail reception, and information reception through an application.

The memory 170 may store data supporting various functions of the content receiving apparatus 100. Also, the memory 170 may store various application programs to be driven by the content receiving apparatus 100 and data and instructions for the operation of the content receiving apparatus 100.

The memory 170 may temporarily or permanently store audio packets received from the content providing apparatus 200. When the audio packets temporarily received by the memory 170 are stored, the memory 170 may function as an audio packet buffer.

The memory 170 may store an audio packet generating rule preset used for generating the audio packets.

The processor 180 may drive an application program stored in memory 170. Furthermore, the processor 180 may operate two or more of the components included in the content receiving apparatus 100 in combination so as to drive the application program.

The processor 180 may control the overall operation of the content receiving apparatus 100 in addition to the operations related to the application program. The processor 180 may provide or process appropriate information or functions to the user by processing signals, data, information, or the like input or output through the above-described components or by driving the application program stored in the memory 170.

When the connection of an external device is required to perform the determined operation, the processor 180 may generate a control signal for controlling the external device and may transmit the generated control signal to the external device.

The processor 180 may receive the audio packets from the content providing apparatus 200, may convert the received audio packets to audio content data, and may output the converted audio content data through the sound output module 152 or transmit the converted audio content data to another output module through the communication modem 110. The processor 180 may be referred to as an audio processor in that the processor 180 converts the audio packets into audio data.

Meanwhile, various embodiments may be implemented within a recording medium readable by a computer or a similar device by using software, hardware, or combination thereof.

Figure 7:
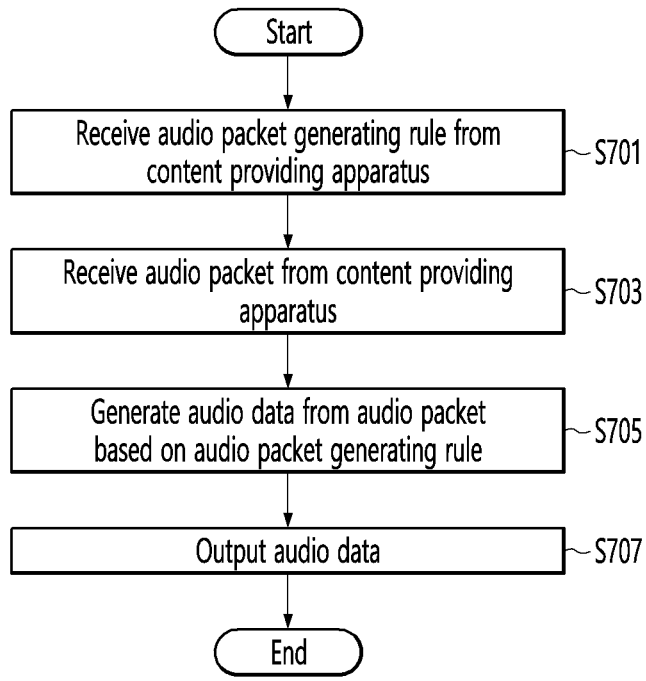
FIG. 7 is a flowchart illustrating an operating method of a content receiving apparatus for providing an audio streaming service, according to an embodiment of the present disclosure.

FIG. 7 is a flowchart illustrating an operating method of the content receiving apparatus 100 for providing the audio streaming service, according to an embodiment of the present disclosure.

Referring to FIG. 7, the processor 180 of the content receiving apparatus 100 receives an audio packet generating rule from the content providing apparatus 200 through the communication modem 110 (S701).

The audio packets transmitted from the content providing apparatus 200 are audio packets of audio sample units or audio sample set units and are transmitted in descending order of priority. Therefore, even if the audio packets transmitted from the content providing apparatus 200 are converted into audio data, the converted audio data is only audio data corresponding to one audio sample or one audio sample set, and their orders need to be recombined. Therefore, in order to generate playback audio data from audio packets, the same audio packet generating rule as that used for generating audio packets is required.

If the same audio packet generating rule is already shared between the content providing apparatus 200 and the content receiving apparatus 100, this step S701 may be omitted.

The processor 180 of the content receiving apparatus 100 receives audio packets from the content providing apparatus 200 through the communication modem 110 (S703).

The audio packets received from the content providing apparatus 200 are audio packets corresponding to the target audio content. However, since part of the audio packets transmitted from the content providing apparatus 200 may not be transmitted according to the situation of the network 300, the audio packets received from the content providing apparatus 200 may be different from the audio packets transmitted from the content providing apparatus 200.

Step S703 of receiving the audio packet may be performed in parallel with step S701 of receiving the audio packet generating rule or may be performed in preference to step S701 of receiving the audio packet generating rule.

The processor 180 of the content receiving apparatus 100 generates audio data from the audio packets based on the audio packet generating rule (S705).

The generating of the audio data from the audio packets may mean converting audio packets into audio data.

The audio packets are generated from the audio data based on the audio packet generating rule. Therefore, the audio data may be generated by inversely performing the method for generating the audio packets based on the audio packet generating rule. The audio packets may be converted into audio data of a PCM format, and the order of the converted audio data may be recombined based on the priority allocating rule. The audio data in which the order of the audio sample groups is recombined is audio data corresponding to the target audio content.

The processor 180 of the content receiving apparatus 100 outputs the generated audio data (S707).

The processor 180 may convert the generated audio data into an audio signal that can be output through the speaker 152, and may output the converted audio signal through the speaker 152. Alternatively, the processor 180 may output audio data by transmitting the generated audio data to an external output device through the communication modem 110.

Although not illustrated in FIG. 7, in one embodiment, the content receiving apparatus 100 may transmit selection information of the target audio content to the content providing apparatus 200, and the content providing apparatus 200 may determine the target audio content based on the selection information received from the content receiving apparatus 100.

The order of steps illustrated in FIG. 7 is only an example, and the present disclosure is not limited thereto. That is, in one embodiment, the order of some steps illustrated in FIG. 7 may be changed. Also, in one embodiment, some steps illustrated in FIG. 7 may be performed in parallel. Furthermore, only some steps illustrated in FIG. 7 may be performed.

Figure 8:
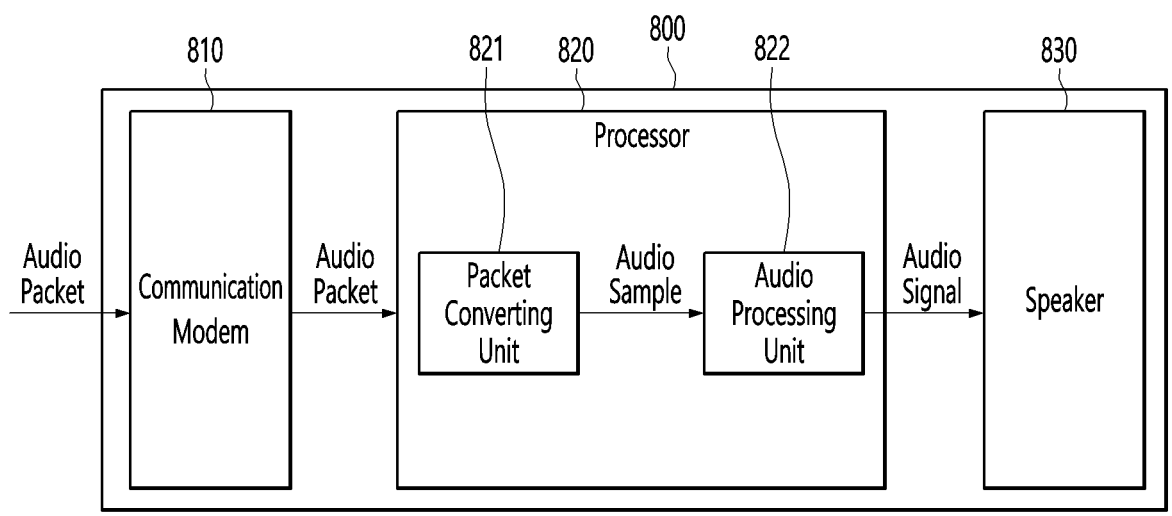
FIG. 8 is a diagram illustrating an operating method of a conventional content receiving apparatus.

FIG. 8 is a diagram illustrating an operating method of the conventional content receiving apparatus 800.

Referring to FIG. 8, the conventional content receiving apparatus 800 may include a communication modem 810, a processor 820, and a speaker 830. The processor 820 may include a packet converting unit 821 and an audio processing unit (or an audio processor) 822.

The communication modem 810 may receive audio packets from the content providing apparatus.

The packet converting unit 821 may convert the received audio packets into audio data or audio samples.

The audio processing unit 822 may convert the audio data or audio samples corresponding to the audio content into an audio signal used for output from the speaker 830.

The speaker 830 may output a sound corresponding to the received audio packet by using the audio signal.

As illustrated in FIGS. 4 and 8, since the conventional content providing apparatus 400 already adjusts the size or contents of the audio packet in consideration of the network state, the conventional content receiving apparatus 800 does not separately convert audio data or audio samples in consideration of the network state.

The conventional content providing apparatus 400 predicts the state of the network based on the network state information collected from the network and determines optimal audio streaming settings based on the predicted state of the network. Therefore, it is necessary to collect network state information and there is a limitation that it cannot accurately respond when the state of the network changes rapidly. In addition, there is a disadvantage that network traffic is consumed in the process of collecting the network state information, and computational power for processing the collected information is consumed.

Figure 9:
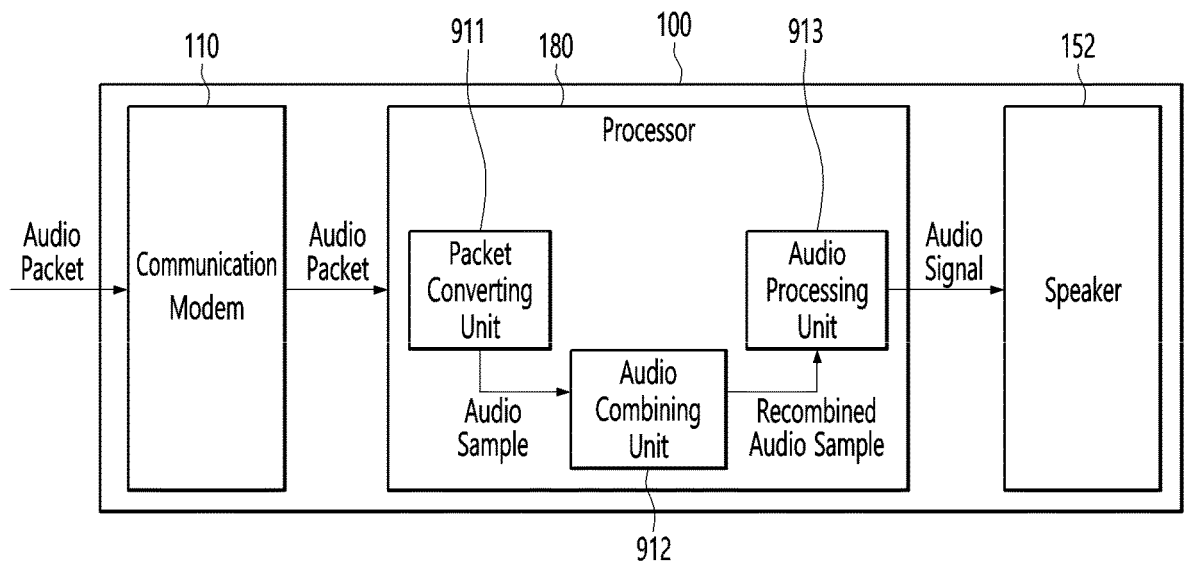
FIG. 9 is a diagram illustrating an operating method of a content receiving apparatus, according to an embodiment of the present disclosure.

FIG. 9 is a diagram illustrating an operating method of the content receiving apparatus 100, according to an embodiment of the present disclosure.

Referring to FIG. 9, the content receiving apparatus 100 according to the embodiment of the present disclosure may include a communication modem 110, a processor 180, and a speaker 152. The processor 180 may include a packet converting unit 911, an audio combining unit 912, and an audio processing unit (or an audio processor) 913.

All or part of the packet converting unit 911, the audio combining unit 912, and the audio processing unit 913 may refer to a hardware implementation included in the processor 180 or may refer to a software implementation using the processor 180.

The communication modem 110 may receive a plurality of audio packets corresponding to target audio content from the content providing apparatus.

The packet converting unit 911 may convert the received audio packets into audio data. Since the audio packets are generated in units of audio samples or units of audio sample sets, audio data converted from the audio packets may include one audio sample or one audio sample set.

The audio combining unit 912 may recombine the order between the audio samples or audio sample sets included in the audio data based on the audio packet generating rule.

The audio processing unit 913 may convert the audio data, whose order is recombined, into audio signals to be used for playback in the speaker 152.

The speaker 152 may output a sound corresponding to the target audio content based on the audio signal.

As illustrated in FIGS. 5 and 9, since the content providing apparatus 200 according to the embodiment of the present disclosure determines the priority of each group according to the audio packet generating rule in the process of generating the audio packet, determines the priority of each sample, and transmits the audio packets generated in units of samples or units of sample sets according to the determined priority, the content receiving apparatus 100 needs a process of recombining the order of the audio samples included in the audio data converted from the audio packets based on the audio packet generating rule.

Compared with FIG. 8, the content receiving apparatus 100 according to the embodiment of the present disclosure does not use end-to-end state information or network state information in the process of generating the audio packets. Therefore, there is an advantage that the audio packets can be generated without being affected by the network state or terminal state.

Figure 10:
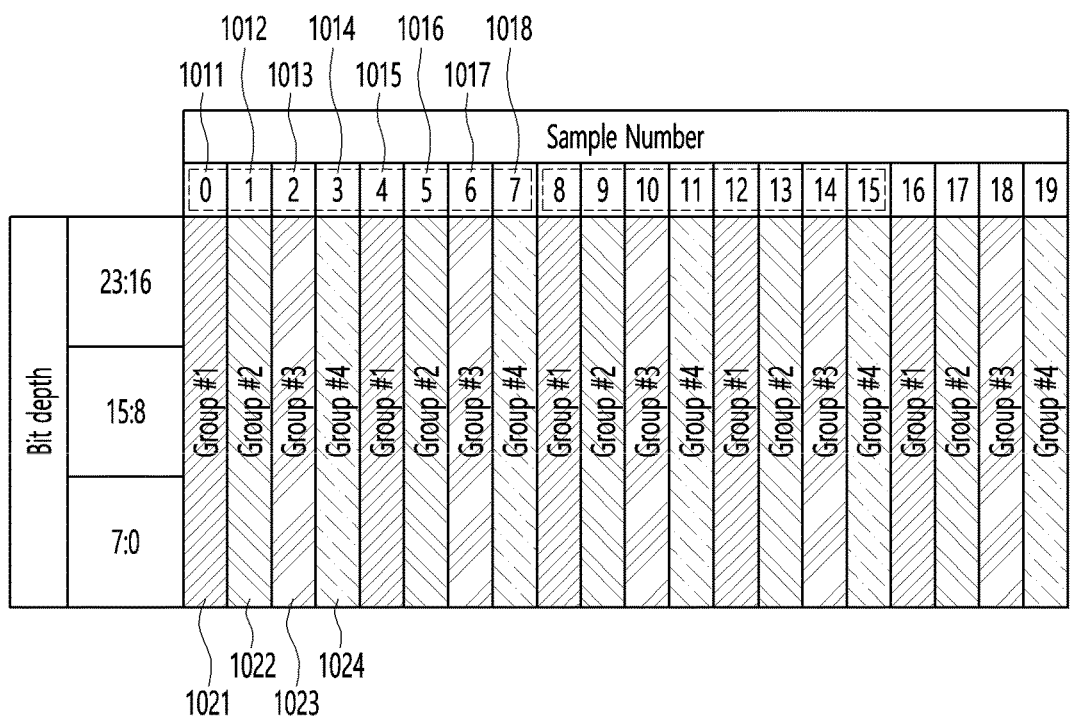
FIGS. 10 to 12 are diagrams illustrating a method for generating an audio packet and a method for providing an audio streaming service, according to an embodiment of the present disclosure.
Figure 11:
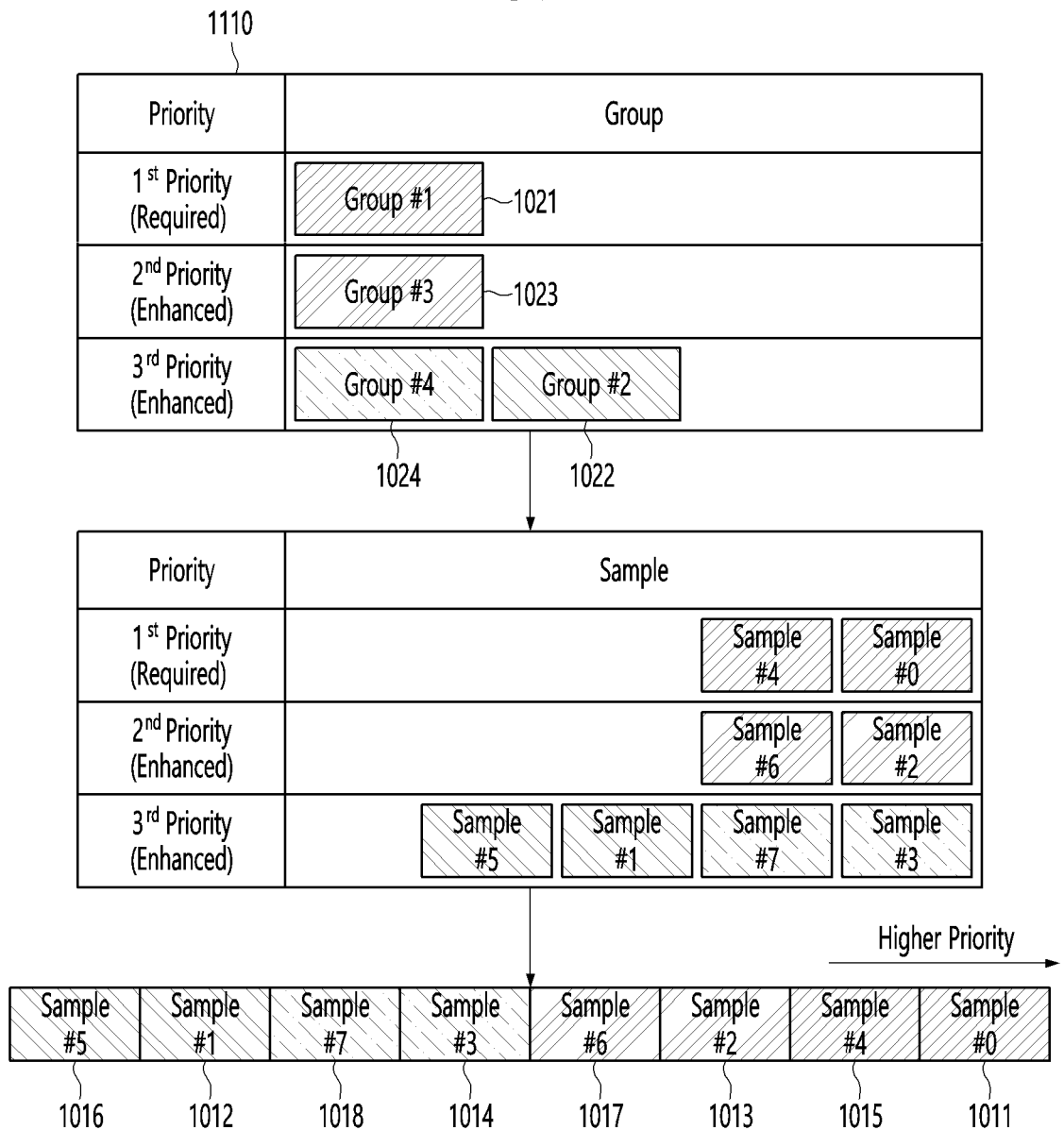
Figure 12:
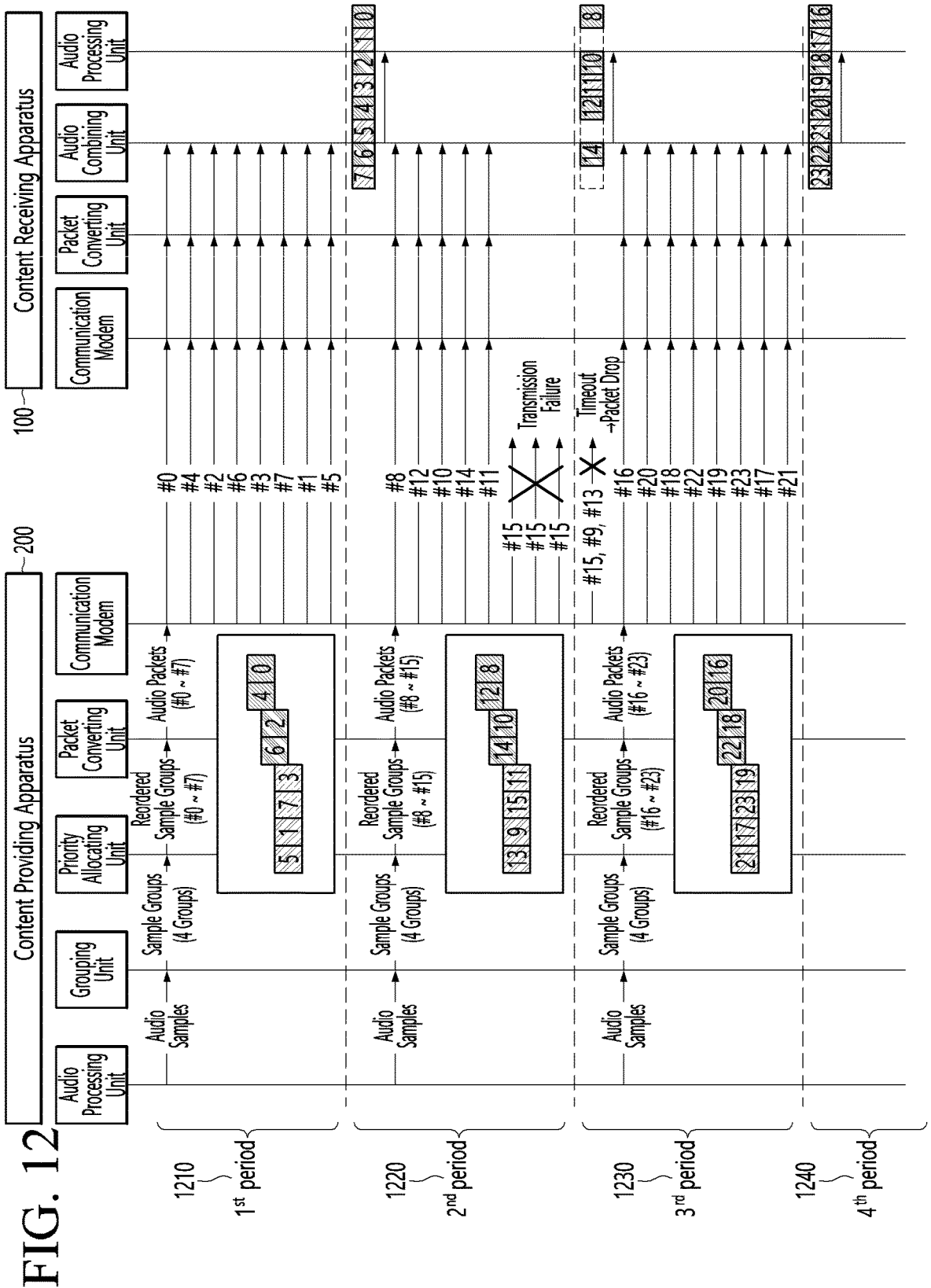

FIGS. 10 to 12 are diagrams illustrating a method for generating an audio packet and a method for providing an audio streaming service, according to an embodiment of the present disclosure.

The method for generating the audio packet according to the embodiment of the present disclosure may refer to a method for generating an audio packet from audio data corresponding to target audio content in the content providing apparatus 200 for providing the audio streaming service. The method for generating audio data of the PCM format from the generated audio packet may be in the reverse order of the method for generating the audio packet.

The audio data of the PCM format is data digitized by sampling an analog sound wave according to a sampling rate or a sampling frequency. An analog sound wave has a continuous waveform, and audio data only includes discrete waveform information that imitates the analog sound wave. The sampling rate may refer to the number of samples extracted per second. Each sample may be represented by a predetermined number of bits or bit depths. As the number of bits increases, the audio data can more accurately represent analog sound waves.

Referring to FIG. 10, in the method for generating the audio packet according to the embodiment of the present disclosure, each sample included in audio data may be distributed or allocated to a predetermined number of groups.

Each sample included in the audio data may be assigned to the same group at regular intervals. That is, samples spaced at regular intervals may be allocated to the same group.

The example of FIG. 10 assumes that the audio data of the sound source is 24 bit 192 kHz and the lowest target streaming quality is 24 bit 48 kHz. In this case, 8 samples of audio data may form one period. Sample #0 (1011) to sample #7 (1018) belong to a first period. The samples included in the audio data are divided into 4 groups. In the first period, sample #0 (1011) and sample #4 (1015) may be distributed to a first group or group #1 (1021), sample #1 (1012) and sample #5 (1016) may be distributed to a second group or group #2 (1022), sample #2 (1013) and sample #6 (1017) may be distributed to a third group or group #3 (1023), and sample #3 (1014) and sample #7 (1018) may be distributed to a fourth group or group #4 (1024).

In FIG. 10, all bits constituting each sample are distributed to one and the same group, but the present disclosure is not limited thereto. In another embodiment, each sample may be distributed in several groups for each bit (or for each bit depth).

Referring to FIG. 11, a priority may be allocated to each group 1021 to 1024. The highest priority group is a required group. A table including priority information for each group may be referred to as a priority table 1110.

Since the first group 1021 is a group for samples that can satisfy the minimum criterion required by the audio streaming service, it may be determined as a first priority. That is, the sampling rate of audio data constituted only by samples belonging to the first group 1021 is ¼ of the sampling rate of the original audio data.

Since the third group 1023 is a group for additional samples that doubles the sampling rate by combining the samples included in the first group 1021, it may be determined as a second priority. That is, the sampling rate of audio data constituted only by samples belonging to the first group 1021 and the second group 1023 is ½ of the sampling rate of the original audio data.

Since the second group 1022 and the fourth group 1024 are a group for additional samples that doubles the sampling rate by combining the samples included in the first group 1021 and the third group 1023, it may be determined as a third priority. That is, the sampling rate of audio data constituted only by samples belonging to the first to fourth groups 1021 to 1024 is equal to the sampling rate of the original audio data.

The groups 1021 to 1024 are allocated to the samples 1011 to 1018 included in the audio data, and the priority is allocated to the groups 1021 to 1024. Therefore, the priority is also allocated to the sample 1011 to 1018. Therefore, a difference in priority occurs for each sample 1011 to 1018, which may influence the transmission order of the audio packets converted for each sample later.

Even for different samples, the samples have the same transmission priority if they belong to the same group. In this case, for the samples belonging to the same group, the transmission priority is higher as the playback order is prior. That is, sample #0 (1011) and sample #4 (1015) belong to the same group #1 (1021), but the playback order of sample #0 (1011) is first. Therefore, in the relationship between sample #0 (1011) and sample #4 (1015), it can be considered that the priority of sample #0 (1011) is higher.

Even different groups may have the same transmission priority. In this case, it does not matter which group has a higher priority among different groups having the same transmission priority. However, even in different groups having the same transmission priority, transmission priorities may not be mixed such that samples belonging to the same group can be continuously transmitted. That is, when group #2 (1022) and group #4 (1024) have the same priority, but group #4 (1024) has a higher priority between them, it can be considered that the priority is higher in the order of sample #3 (1014), sample #7 (1018), sample #1 (1012), and sample #5 (1016).

As described above, when the priority between samples 1011 to 1018 is determined, audio packets may be generated on a sample basis or a sample set basis in descending order of priority.

Referring to FIG. 12, audio data includes 8 audio samples in one period, and an audio packet is generated and transmitted in each period. Here, it is assumed that the effective transmission time of the audio packet is one period.

In the first period 1210, the content providing apparatus 200 may group samples #0 to sample #7, determine the priorities of samples based on priority for each group, and generate audio packets on a sample basis. The audio packet corresponding to sample #0 is audio packet #0. The content providing apparatus 200 may transmit audio packets #0 to #7 to the content receiving apparatus 100 in the order of audio packet #0, audio packet #4, audio packet #2, audio packet #6, audio packet #3, audio packet #7, audio packet #1, and audio packet #5 based on the determined priority.

In the first period 1210, if the state of the network 300 is good, the content receiving apparatus 100 may receive all audio packets #0 to #7 and may convert audio packets #0 to #7 into samples (audio data for each sample). The content receiving apparatus 100 may receive audio packets during the first period 1210 and may recombine the samples in the order of sample #0, sample #1, sample #2, sample #3, sample #4, sample #5, sample #6, and sample #7 based on the audio packet generating rule in the second period 1220. The content receiving apparatus 100 may convert audio data including samples #0 to #7, whose order is recombined in the second period 1220, into an audio signal and may output the converted audio signal through a speaker.

In the second period 1220, the content providing apparatus 200 may group samples #8 to #15, determine the priorities of samples based on the priority for each group, and transmit audio packets on a sample basis. The content providing apparatus 200 may transmit audio packets #8 to #15 to the content receiving apparatus 100 in the order of audio packet #8, audio packet #12, audio packet #10, audio packet #14, audio packet #11, audio packet #15, audio packet #9, and audio packet #13 based on the determined priority.

In the second period 1220, if the state of the network 300 is bad, the content receiving apparatus 100 may receive only part of the audio packets #8 to #15, that is, audio packet #8, audio packet #12, audio packet #10, audio packet #14, and audio packet #11 and may convert the received audio packets into samples. Audio packet #15, audio packet #9, and audio packet #13 are transmitted at a lower priority and are packets that have failed to transmit as the bandwidth of the network 300 decreases. The content receiving apparatus 100 may receive audio packets during the second period 1220 and may recombine the samples corresponding to the received audio packets in the order of sample #8, (BLANK), sample #10, sample #11, sample #12, (BLANK), sample #14, and (BLANK) based on the audio packet generating rule in the third period 1230. The content receiving apparatus 100 may convert audio data including samples, whose order is recombined in the third period 1230, into an audio signal and may output the converted audio signal through a speaker. In this case, since some samples (sample #9, sample #13, and sample #15) have not been transmitted, the content receiving apparatus 100 may generate a complementary audio signal by using an error concealment technique.

In the third period 1230, the content providing apparatus 200 may group samples #16 to sample #23, determine the priorities of samples based on priority for each group, and generate audio packets on a sample basis. The content providing apparatus 200 may transmit audio packets #16 to #23 to the content receiving apparatus 100 in the order of audio packet #16, audio packet #20, audio packet #18, audio packet #22, audio packet #19, audio packet #23, audio packet #17, and audio packet #21 based on the determined priority. Since one period, which is an effective transmission time, has passed for audio packet #15, audio packet #9, and audio packet #13, which have failed to be transmitted, in the second period 1220, the content providing apparatus 200 may not retransmit audio packet #15, audio packet #9, and audio packet #13.

In the third period 1230, if the state of the network 300 is good, the content receiving apparatus 100 may receive all audio packets #16 to #23 and may convert audio packets #16 to #23 into samples (audio data for each sample). The content receiving apparatus 100 may receive audio packets during the third period 1230 and may recombine the samples in the order of sample #16, sample #17, sample #18, sample #19, sample #20, sample #21, sample #22, and sample #23 based on the audio packet generating rule in the fourth period 1240. The content receiving apparatus 100 may convert audio data including samples #16 to #23, whose order is recombined in the fourth period 1240, into an audio signal and may output the converted audio signal through a speaker.

The content receiving apparatus 100 may acquire samples by converting the packets received from the content providing apparatus 200, generate audio data corresponding to the target audio content by recombining the order of samples based on a pre-shared audio packet generating rule, and output the target audio content by using the generated audio data. Since the content providing apparatus 200 determined the transmission order of the audio packets (or samples corresponding thereto) based on the audio packet generating rule, the content receiving apparatus 100 may recombine the order of packets (or samples corresponding thereto) by reversing the process performed by the content providing apparatus 200 using the same audio packet generating rule for the received packet.

Figure 13:
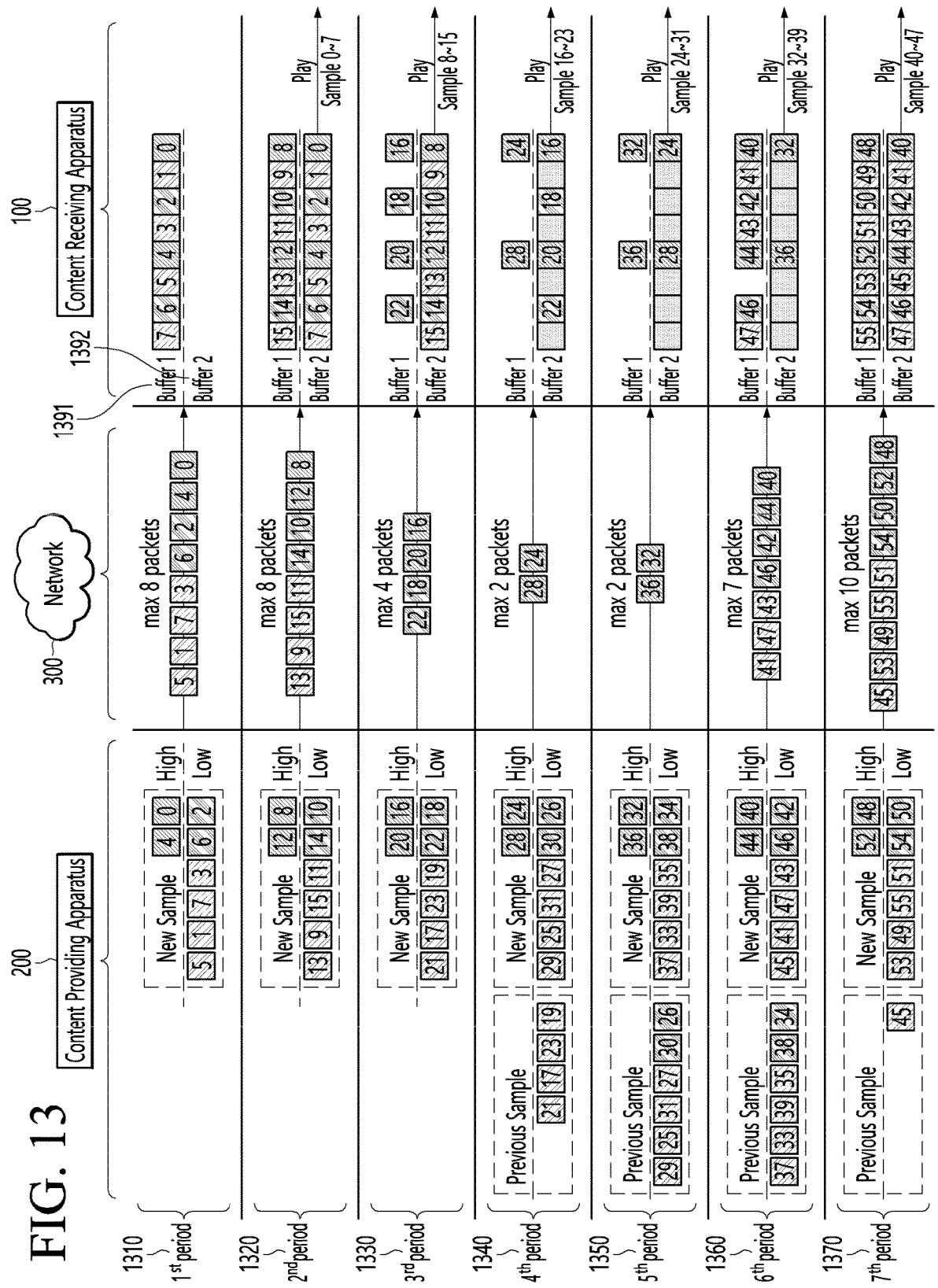
FIG. 13 is a diagram illustrating a method for providing an audio streaming service, according to an embodiment of the present disclosure.

FIG. 13 is a diagram illustrating a method for providing an audio streaming service, according to an embodiment of the present disclosure.

Referring to FIG. 13, audio data includes 8 audio samples in one period, and an audio packet is generated and transmitted in each period. Here, it is assumed that the effective transmission time of the audio packet is two periods. Also, it is assumed that audio samples are grouped into four groups, and each group is determined as one of two priorities.

The content receiving apparatus 100 may include a buffer for temporarily storing packets transmitted from the content providing apparatus 200 or samples converted from the packets, and the buffer may include a first buffer 1391 and a second buffer 1392. The first buffer 1391 is a reception buffer and is a buffer for temporarily storing received packets or samples for a predetermined period. The second buffer 1392 is a playback buffer. During one period, the received packets or samples may be stored in the first buffer 1391. When one period has passed, the packets or samples stored in the first buffer 1391 may be transferred to the second buffer 1392. The audio content may be output based on the packets or samples stored in the second buffer 1392.

In a first period 1310, the content providing apparatus 200 may group samples #0 to #7 and allocate priorities to samples #0 to #7. Therefore, sample #0 and sample #4 may be determined as the first rank (or the first priority), and sample #2, sample #6, sample #3, sample #7, sample #1, and sample #5 may be determined as the second rank (or the second priority). The content providing apparatus 200 may transmit packets corresponding to the samples in the order of sample #0, sample #4, sample #2, sample #6, sample #3, sample #7, sample #1, and sample #5 to the content receiving apparatus 100 through the network 300. The network 300 is in a state of being capable of transmitting up to 8 packets, the content receiving apparatus 100 may receive all of samples #0 to #7 transmitted from the content providing apparatus 200, and the received packets may be stored in the first buffer 1391.

In a second period 1320, the content providing apparatus 200 may transmit packets corresponding to the samples in the order of sample #8, sample #12, sample #10, sample #14, sample #11, sample #15, sample #9, and sample #13. The network 300 is in a state of being capable of transmitting up to 8 packets, the content receiving apparatus 100 may receive all of samples #8 to #15 transmitted from the content providing apparatus 200, and the received samples may be stored in the first buffer 1391. Samples #0 to #7 previously stored in the first buffer 1391 may be moved to the second buffer 1392, and the content receiving apparatus 100 may output the audio content by using samples #0 to #7 stored in the second buffer 1392.

In a third period 1330, the content providing apparatus 200 may transmit packets corresponding to the samples in the order of sample #16, sample #20, sample #18, #22, sample #19, sample #23, sample #17, and sample #21. The network 300 is in a state of being capable of transmitting up to 4 packets, the content receiving apparatus 100 may receive only sample #16, sample #20, sample #18, and sample #22 among samples transmitted from the content providing apparatus 200, and the received packets may be stored in the first buffer 1391. Samples #8 to #15 previously stored in the first buffer 1391 may be moved to the second buffer 1392, and the content receiving apparatus 100 may output the audio content by using samples #8 to #15 stored in the second buffer 1392.

In a fourth period 1340, the content providing apparatus 200 may transmit packets corresponding to the samples in the order of sample #24, sample #28, sample #26, #30, sample #27, sample #31, sample #25, and sample #29. Since there are packets that have failed to be transmitted in the third period 1330, which is the previous period, and the effective transmission time is two periods, the content providing apparatus 200 may additionally transmit packets corresponding to the samples in the order of sample #19, sample #23, sample #17, and sample #21 that have failed to be transmitted in the third period 1330. The network 300 is in a state of being capable of transmitting up to 2 packets, the content receiving apparatus 100 may receive only sample #24 and sample #28 among the samples transmitted from the content providing apparatus 200, and the received samples may be stored in the first buffer 1391. Sample #16, sample #18, sample #20, and sample #22 previously stored in the first buffer 1391 may be moved to the second buffer 1392, and the content receiving apparatus 100 may output the audio content by using sample #16, sample #18, sample #20, and sample #22 stored in the second buffer 1392. Sample #17, sample #19, sample #21, and sample #23 are not included in the second buffer 1392, and the content receiving apparatus 100 may generate audio data whose errors caused by missing samples are corrected by using a packet error concealment technique.

In the fifth period 1350, the content providing apparatus 200 may transmit packets corresponding to the samples in the order of sample #32, sample #36, sample #34, sample #38, sample #35, sample #39, sample #33, and sample #37. Packets corresponding to samples may be additionally transmitted in the order of sample #26, sample #30, sample #27, sample #31, sample #25, and sample #29 that have failed to be transmitted in the previous period, that is, the fourth period 1340. The network 300 is in a state of being capable of transmitting up to 2 packets, the content receiving apparatus 100 may receive only sample #32 and sample #36 among the samples transmitted from the content providing apparatus 200, and the received samples may be stored in the first buffer 1391. Samples #24 to #28 previously stored in the first buffer 1391 may be moved to the second buffer 1392, and the content receiving apparatus 100 may output the audio content by using samples #24 to #28 stored in the second buffer 1392. Since sample #17, sample #19, #21, and sample #23 of the third period 1330 are not transmitted even in the fourth period 1340 and two periods that are the effective transmission period has passed, samples #17, sample #19, sample #21, and sample #23 may be dropped by timeout in the fifth period 1350.

In the sixth period 1360, the content providing apparatus 200 may transmit packets corresponding to the samples in the order of sample #40, sample #44, sample #42, sample #46, sample #43, sample #47, sample #41, and sample #45. Packets corresponding to samples may be additionally transmitted in the order of sample #34, sample #38, sample #35, sample #39, sample #33, and sample #37 that have failed to be transmitted in the previous period, that is, the fifth period 1350. The network 300 is in a state of being capable of transmitting up to 7 packets, the content receiving apparatus 100 may receive only samples #40 to #44, sample #46, and sample #47 among samples transmitted from the content providing apparatus 200, and the received samples may be stored in the first buffer 1391. Samples #32 to #36 previously stored in the first buffer 1391 may be moved to the second buffer 1392, and the content receiving apparatus 100 may output the audio content by using sample #32 sample #36 stored in the second buffer 1392.

In a seventh period 1370, the content providing apparatus 200 may transmit packets corresponding to the samples in the order of sample #48, sample #52, sample #50, sample #54, sample #51, sample #55, sample #49, and sample #53. A packet corresponding to sample #45 that has failed to be transmitted in the fifth period 1350, which is the previous period, may be additionally transmitted. The network 300 is in a state of being capable of transmitting up to 10 packets, the content receiving apparatus 100 may receive all of the samples transmitted from the content providing apparatus 200, and the received samples may be stored in the first buffer 1391. Samples #40 to #44, sample #46, and sample #37 previously stored in the first buffer 1391 may be moved to the second buffer 1392. The content receiving apparatus 100 may store the sample #45 in the second buffer 1392 since sample #45 among the received samples is a sample to be transmitted in the sixth period 1360, which is the previous period. Therefore, the content receiving apparatus 100 may output audio content by using samples #40 to #47 stored in the second buffer 1322.

Therefore, even in a situation in which the network 300 is in a poor state, the content providing apparatus 200 preferentially transmits a packet for a sample necessary to provide the minimum quality. In this manner, the content providing apparatus 200 may transmit outputable audio content data to the content receiving apparatus 100 without predicting the state of the network 300. Therefore, the content receiving apparatus 100 can provide a seamless audio service by outputting high-quality audio content when the state of the network 300 is good and outputting low-quality audio content when the state of the network 300 is poor.

On the other hand, in the apparatuses for providing the conventional streaming service, a packet for a sample that fails to be transmitted in each period is attempted to be transmitted in the next period. Therefore, since samples required for outputting audio content are not secured and a part of the content is omitted in a certain period, buffering may occur, or only silence is output.

As described above, the sample transmitted from the content providing apparatus 200 to the content receiving apparatus 100 may include a sample of a current period and a sample of a previous period in which the effective transmission time has not passed. The transmission priority between the sample of the current period and the samples of the previous period may be variously set according to embodiments.

In one embodiment, the sample of the current period may be determined to have higher transmission priority in relation to the samples of the past periods. For example, it may be determined that the second priority sample of the current period has a higher transmission priority than the first priority sample of the previous period. In this case, the second priority sample of the current period may be transmitted in preference to the first priority sample of the previous period.

In another embodiment, each sample preferentially considers the priority determined by the audio sample group. Among samples having the same priority, it may be determined that the transmission priority is higher as the period to which the sample belongs is closer to the present. For example, the second priority sample of the current period has a lower priority, determined by the audio sample group, when compared with the first priority sample of the previous period. Therefore, the first priority sample of the previous period may be transmitted in preference to the second priority sample of the current period. However, even in this case, among samples having the same priority, the first priority sample of the current period, in which the period to which the sample belongs is close to the present, may be transmitted in preference to the first priority sample of the previous period.

In addition, when the effective transmission time exceeds 2 periods, samples belonging to more than 2 periods may be stored in the reception buffer 1391 of the content receiving apparatus 100. In this case, when the period is changed, only the sample corresponding to the playback target period among the samples stored in the reception buffer 1391 of the content receiving apparatus 100 may be moved to the playback buffer 1392. When the audio data including samples included in the playback buffer 1392 of the content receiving apparatus 100 is output, the playback buffer 1392 may be emptied.

According to various embodiments of the present disclosure, it is possible to provide the audio streaming service that outputs audio content having a quality suitable for the network state without using network state information.

According to various embodiments of the present disclosure, it is possible to provide the delayless and seamless audio streaming service by preferentially transmitting samples essential for providing the audio streaming service and not transmitting samples whose effective transmission time has been exceeded.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

Other implementations are within the scope of the following claims.

What is claimed is:
1. A content providing apparatus configured to provide an audio streaming service, comprising:
   a communication modem configured to communicate with a content receiving apparatus through a wired or wireless network; and
   a processor configured to:
   determine target audio content for the content receiving apparatus,
   determine an audio packet generating rule for the target audio content,
   transmit the audio packet generating rule to the content receiving apparatus through the communication modem,
   generate, based on the transmitted audio packet generating rule, an audio packet from audio data corresponding to the target audio content, and
   transmit the generated audio packet to the content receiving apparatus through the communication modem,
   wherein the audio packet generating rule includes an audio data division unit, a number of groups, a number of transmission priorities, and an allocating rule for the transmission priorities, and wherein the processor is further configured to:
divide the audio data into a plurality of units by the audio data division unit,
group the plurality of units into a plurality of groups based on the number of transmission priorities, each group of the plurality of groups including one or more units,
allocate, based on the allocating rule, transmission priorities for the plurality of groups,
determine transmission priorities for the one or more units of each group based on the allocated transmission priorities for the plurality of groups,
generate a plurality of audio packets based on the one or more units of each group, and
transmit the plurality of audio packets to the content receiving apparatus through the communication modem in a descending order of the transmission priorities.

2. The content providing apparatus of claim 1, wherein the processor is further configured to continuously transmit audio packets corresponding to units in a same group.

3. The content providing apparatus of claim 2, wherein the processor is further configured to transmit an audio packet that has a higher playback order in a higher priority than audio packets having a lower transmission priority to the audio packet.

4. The content providing apparatus of claim 1:
wherein the audio packet generating rule further includes an effective transmission time, and
wherein the processor is further configured to transmit an audio packet, from among the plurality of audio packets, whose effective transmission has not passed.

5. The content providing apparatus of claim 4, wherein the processor is further configured to transmit, from among the plurality of audio packets, an audio packet corresponding to a current period in a higher priority than an audio packet corresponding to a previous period.

6. The content providing apparatus of claim 1, wherein the processor is further configured to:

receive a user selection of the target audio content from the content receiving apparatus through the communication modem, and
determine, based on the received user selection, the target audio content.

7. A method performed by a content providing apparatus and for providing an audio streaming service, comprising:
determining target audio content for the content providing apparatus;
determining an audio packet generating rule for the target audio content;
transmitting the audio packet generating rule to a content receiving apparatus;
generating, based on the audio packet generating rule, an audio packet from audio data corresponding to the target audio content; and
transmitting the generated audio packet to the content receiving apparatus,
wherein the audio packet generating rule includes an audio data division unit, a number of groups, a number of transmission priorities, and an allocating rule for the transmission priorities, and
wherein the method further comprises:
dividing the audio data into a plurality of units by the audio data division unit,
grouping the plurality of units into a plurality of groups based on the number of transmission priorities, each group of the plurality of groups including one or more units,
allocating, based on the allocating rule, transmission priorities for the plurality of groups,
determining transmission priorities for the one or more units of each group based on the allocated transmission priorities for the plurality of groups,
generating a plurality of audio packets based on the one or more units of each group, and
transmitting the plurality of audio packets to the content receiving apparatus through a communication modem in a descending order of the transmission priorities.

* * * * *